United States Patent [19]

Reimschuessel et al.

[11] Patent Number: 4,605,707

[45] Date of Patent: Aug. 12, 1986

[54] QUATERNARY POLYALKYLENE IMINE CONTAINING 2-HYDROXYPROPYLTRIMETHYL AMMONIUM SALT PENDENT SIDE CHAIN GROUPS

[75] Inventors: Herbert K. Reimschuessel; Harry E. Ulmer, both of Morristown, N.J.

[73] Assignee: Allied Corporation, Morris Township, Morris County, N.J.

[21] Appl. No.: 704,849

[22] Filed: Feb. 25, 1985

[51] Int. Cl.$^4$ .................... C08G 73/00; C08F 8/12
[52] U.S. Cl. .................... 525/410; 210/735; 525/417; 525/540
[58] Field of Search ............ 525/410, 417, 540; 210/735

[56] References Cited

U.S. PATENT DOCUMENTS 2,995,512  8/1961  Weidner et al. ............ 210/54
4,206,295  6/1980  Wagner et al. ............ 525/410

OTHER PUBLICATIONS

Alkylenimine Polymers—Encyclopedia of Polymer Sci. & Tech. vol. 1, pp. 741–742 (1964) and Supp. to vol. 1, p. 44 (1976); Publ. John Wiley & Sons.

Primary Examiner—Harold D. Anderson
Attorney, Agent, or Firm—Arthur J. Plantamura; Jay P. Friedenson

[57] ABSTRACT

Polyalkylene imines containing 2-hydroxypropyltrimethylammonium salt side chains are obtained by reaction between alkylene imine polymers and copolymers and a glycidyltrimethylammonium salt. These polymers are very effective flocculants, particularly in the area of water clarification. They are obtained from a variety of sources, e.g. by modification of either commercial polyethylene imines or polymers derived from oxazolines, and oxazinolines, from the polymerization of aziridine monomers or from the condensation of a low molecular weight polyamine and a dihaloalkane.

8 Claims, 1 Drawing Figure

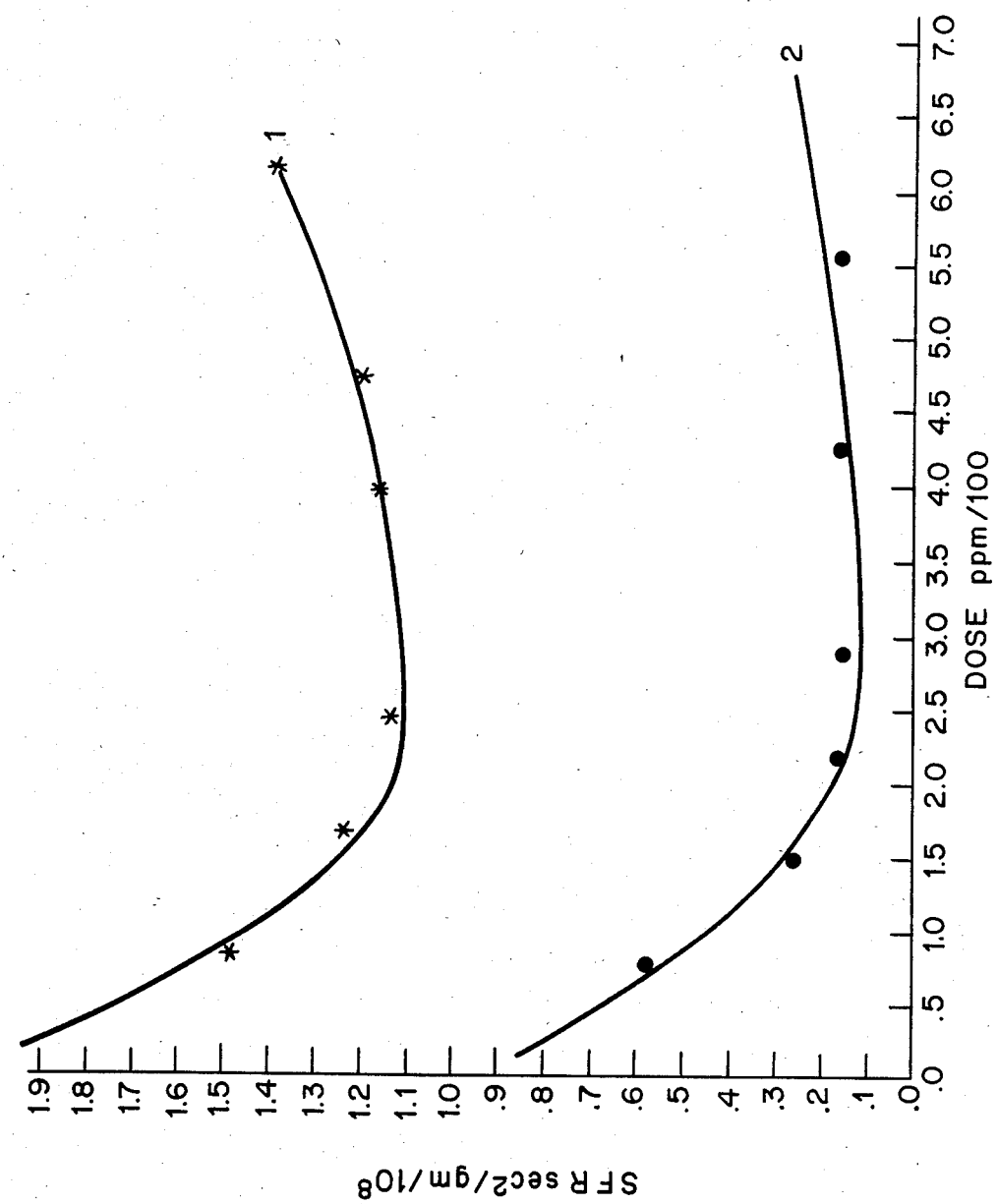

QUATERNARY POLYALKYLENE IMINE CONTAINING 2-HYDROXYPROPYLTRIMETHYL AMMONIUM SALT PENDENT SIDE CHAIN GROUPS

DESCRIPTION

This invention relates to new polymeric structures containing quaternary moieties, specifically the invention concerns polyalkylene imines that contain 2-hydroxypropyltrimethylammonium salt side chains and are characterized by both good solubility and improved flocculant characteristics. The derivation of the polyalkylene imine backbone structure may be from the ring opening polymerization and copolymerization of aziridine type monomers, from substituted 2-oxazolines or 2-oxazinolines, or from any known process such as the stepwise condensation of a low molecular weight polyamine and a dihaloalkane, yielding linear or branched structures in which alkylene segments are interlinked by nitogen atoms a fraction or all of which being part of an unsubstituted imino group.

BACKGROUND OF THE INVENTION

Polyalkylene imines, particularly polyethylene imine are known to have utility as flocculants and for water treatment; generally as the free bases or in salt form. Although their performance is rather dosage sensitive, these materials are effective in water clarification operation. However, when used in the treatment, e.g. dewatering, of some industrial and municipal sludges the performance of polyethylene imines has been unsatisfactory.

Accordingly there is a need for polymers that are suitable to effect better sludge dewatering by reduced resistance to filtration in water treatment operations.

SUMMARY OF THE INVENTION

The invention relates to new polymeric structures containing quaternary moieties. In particular, the invention concerns polyalkylene imines that contain 2-hydroxypropyltrimethylammonium salt side chains and are characterized by both good solubility and improved flocculant characteristics. The polyalkylene imine polymers of the invention comprise a polyalkyene imine backbone polymer containing 2-hydroxypropyltrimethylammonium salt pendent side chain groups said polymer having recurring units of the general formula:

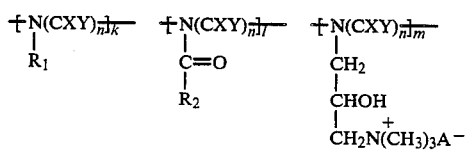

where n=integer of 2 to 12; k, l and m=mole fractions within the ranges: of k=0 to 0.9, l=0 to 0.9, m=0.1 to 1.0, wherein $R_1$ and $R_2$ may be the same or different and are hydrogen or alkyl radicals of 1 to 6 carbon atoms and x and y are H or an alkyl radical having 1 to 6 carbon atoms, and $A^-$ is an anion derived from halogen, nitrate, sulfate, alykl sulfate, or perchlorate. The backbone structure of the polymers of the invention can result from the ring opening polymerization and copolymerization of aziridine type monomers or substituted 2-oxazolines or 2-oxazinolines, or from various processes such as the step-wise condensation of a low molecular weight polyamine and a dihaloalkane, yielding linear or branched structures in which alkylene segments are interlinked by nitrogen atoms a fraction or all of which being part of an unsubstituted imino group. Good results with respect to the specific filtration resistance were obtained with glycidyl trimethylammonium chloride (GTA) modified polyethylene imine. The performance of the modified product exceeded that of the unmodified polyethylene imine by a factor of about 10. Even low molecular weight polyethylene imines showed performances that were comparable with that of typical polyacrylamide Mannich base products used for sludge dewatering.

BRIEF DESCRIPTION OF THE DRAWING

The FIGURE of the drawing is a graphical presentation of the specific filtration resistance (SFR) as a function of the polymer dose in ppm. Whereas for the unmodified polymer the minimum SFR value is at $1.1 \times 10^8$ sec$^2$/g (curve 1), this value decreased by a factor of ten for the GTA modified polymer (curve 2).

DESCRIPTION OF THE PREFERRED EMBODIMENTS

The polymeric structure of the invention comprise quaternary moieties and specifically polyalkylene imines that contain 2-hydroxypropyltrimethylammonium salt side chains. Polymers having this structure are characterized by both good solubility and improved flocculant characteristics. The substantially water soluble polyalkylene imine polymer of the invention comprises a polyalkyene imine backbone polymer containing 2-hydroxypropyltrimethylammonium salt pendent side chain groups said polymer having recurring units of the general formula:

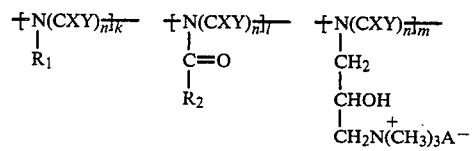

where n=integer of 2 to 12; k, l and m=mole fractions within the ranges: of k=0 to 0.9, l=0 to 0.9, m=0.1 to 1.0 wherein $R_1$ and $R_2$ may be the same or different and are hydrogen or alkyl radicals of 1 to 6 carbon atoms and x and y are H or an alkyl radical of 1 to 6 carbon atoms, and $A^-$ is an anion derived from halogen, nitrate, sulfate, alkyl sulfate or perchlorate.

The backbone of said structure is derived from the ring opening polymerization of monomers selected from the group consisting of aziridine monomers of the formula:

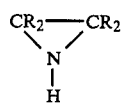

2-oxazoline monomers of the formula

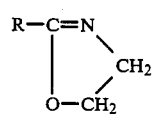

2-oxazinoline monomers of the formula

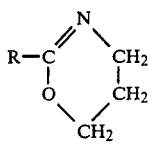

and from the condensation reaction product of a polyamine of the formula

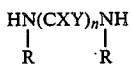

with a dihaloalkane of the formula

wherein n=integer of 2 to 12 R is hydrogen or an alkyl unit of from 1 to 6 carbon atoms, X and Y are H or an alkyl radical having 1 to 6 carbon atoms and Z is a halogen selected from chlorine, bromine, fluorine and iodine, preferably chlorine.

The polyalkylene imine backbone of the polymeric structure as noted can be obtained by the ring opening polymerization of aziridine type monomers, which are used in preparing homopolymers or copolymers. Substituted and unsubstituted 2-oxazolines or 2-oxazinolines may be employed as may monomers used in any other known process, such as the stepwise condensation of a low molecular weight polyamine and a dihaloalkane, yielding linear or branched structures in which alkylene segments are interlinked by nitrogen atoms, a fraction or all of which being part of an unsubstituted imino group.

Examples of aziridine monomers of the above formula are: ethylene imine and its alkyl substituted homologues. Examples of the 2-oxazoline and 2-oxazinoline monomers of the above formula are: 2-ethyl and lower alkyl derivatives of oxazoline and oxazinoline Examples of polyamines and of dihaloalkanes of the above formulas which may be condensed are: ethylene diamine and dichloroethane and their homologues.

Superior results were obtained with a GTA modified polyethylene imine. The performance of the modified product exceeded that of unmodified polyethylene imine by a factor of about 10, even though the molecular weight of the polyethylene imine used in this case was rather low. The performance of the modified product was comparable with that of a typical polyacrylamide Mannich base product used for sludge dewatering.

A graphical presentation of the SFR test results is shown in the FIGURE of the drawing. The polyethylene imine used for GTA modification was prepared by polymerization of 2-ethyloxazoline and subsequent hydrolysis of the propionic acid groups. In a particular sample the hydrolysis was about 90% complete. Graphical presentations of the test results are shown in the drawing where the curve 1 represents the performance of the unmodified polyethylene imine derivative and curve 2 that of the GTA modified material in which more than 97% of the NH groups containined 2-hydroxypropyltrimethyl ammonium chloride units.

The following examples illustrate features of the invention but are not to be interpreted as limiting its scope.

EXAMPLE 1

5 g of copolymer obtained by partial hydrolylsis of poly (2-ethyloxazoline) containing about 90% ethylene imine segments and 10% of N-propionyl ethylene imine segments was dissolved in 10 ml of methanol. To this solution was added a solution of 14.8 g of glycidyltrimethylammonium chloride dissolved in 10 ml of methanol. The temperature of the resulting mixture increased slightly (about 5° C.). Stirring was continued for 20 hours at room temperature; during this time the viscosity of the solution had increased. The polymer was isolated by precipitation in acetone and purified by extraction with acetone. The yield of the modified polymer was 19.55 g corresponding of 97.3% N-substitution. The polymer was found to be soluble in water though the starting polymer had been insoluble.

EXAMPLE 2

A diluted aqueous solution of the polymer as obtained in Example 1 was prepared and used for a primary municipal sludge. The flocculant efficacy, as measured by the specific filtration resistance, was compared with that of the unmodified ethylene imine copolymer. The results are shown in the drawing.

In the drawing, curve 1 pertains to the unmodified copolymer whereas curve 2 shows the performance of the 2-hydroxypropyltrimethylammonium chloride derivative. As can be seen, use of the modified polyethylene imine resulted in a marked reduction of the resistance to filtration by a factor of the order of about 10.

Polyalkylene imines have utility as flocculants and are employed for water treatment; generally as the free bases or in salt form. The performance of these materials is dosage sensitive. Also, they are effective in water clarification operations. They are unsatisfactory for the treatment in the dewatering of industrial and municipal sludges. The polymers of this invention characterized by the presence of quaternized centers in the form of 2-hydroxypropyltrimethylammonium chloride side chains, upon addition to aqueous sludges effected, a surprisingly reduced resistance to filtration.

It was also unexpectedly found that the introduction of 2-hydroxypropyltrimethylammonium chloride side chains rendered readily soluble certain water insoluble polymers. This group of polymers is represented for instance by the partially N-substituted polyethylene imines that may be obtained by the ring opening polymerization of compounds such as the 2-alkyloxazolines with subsequent partial hydrolysis of the N-acyl groups.

The specific details and specific embodiments are illustrative of the manner of practicing the invention. It will be understood, therefore, that various expedients known to those skilled in the art may be employed without departing from the spirit of the invention or the scope of the appended claims.

What is claimed:

1. A substantially water soluble polyalkylene imine polymer comprising a polyalkyene imine backbone containing 2-hydroxypropyltrimethylammonium salt pendent side chains, said polymer having recurring units of the formula:

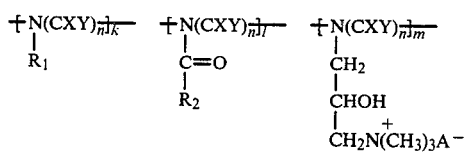 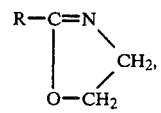

2-oxazinoline monomers of the formula

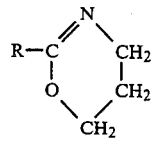

and a polymeric reaction product of polyamine of the formula $$HN(CXY)_nNH$$
$$\phantom{HN(CX}|\phantom{Y)_n}|$$
$$\phantom{HN(CXY)_n}R\phantom{NH}R$$

with a dihaloalkane of the formula $$Z-(CXY)_n-Z$$

where n is an integer of 2 to 12; k, l and m are mole fractions within the ranges of 0 to 0.9, 0 to 0.9 and 0.1 to 1.0, respectively, and wherein $R_1$ and $R_2$ are the same or different and are hydrogen or alkyl radicals of 1 to 6 carbon atoms and X and Y are H or an alkyl radicals of 1 to 6 carbon atoms, and A is an anion derived from halide, nitrate, sulfate, alkyl sulfate, or perchlorate.

2. The polymer of claim 1 wherein R is hydrogen.

3. The polymer of claim 1 where X and Y are hydrogen.

4. The polymer of claim 1 wherein $A^-$ is a member of the group consisting of halide, nitrate, sulfate, alkyl sulfate and perchlorate.

5. The polymer of claim 1 where n is 2.

6. The polymer of claim 1 wherein the backbone of said formula is derived from ring opening polymerization of monomers selected from the group consisting of aziridine monomers

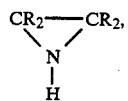

2-oxazoline monomers of the formula wherein n is an integer of 2 to 12, Z is a halogen selected from chlorine, bromine, fluorine or iodine, and R is hydrogen or an alkyl unit of from 1 to 6 carbon atoms.

7. The polymer of claim 1 wherein the backbone of said polymer comprises a copolymer of ethylene imine and N-propionyl ethylene imine and said chains comprising the reaction product of said backbone with glycidyltrimethylammonium chloride.

8. A method of treating sludge containing water comprising dispersing into said water from 0.001 percent to about 0.1 percent by weight of the polymer of claim 1.

* * * * *